United States Patent
Cheskis et al.

(10) Patent No.: US 9,581,707 B2
(45) Date of Patent: Feb. 28, 2017

(54) SYSTEM FOR AUTOMATED IDENTIFICATION OF SURFACES FOR BUILDING OF GEOLOGIC HYDRODYNAMIC MODEL OF OIL AND GAS DEPOSIT BY SEISMIC DATA

(71) Applicant: OOO Rock Flow Dynamics, Moscow (RU)

(72) Inventors: Olga Andreevna Cheskis, Moscow (RU); Semen Leonidovich Tregub, Moscow (RU); Andrey Sergeevich Kazarov, Moscow (RU)

(73) Assignee: OOO Rock Flow Dynamics, Moscow (RU)

(*) Notice: Subject to any disclaimer, the term of this patent is extended or adjusted under 35 U.S.C. 154(b) by 387 days.

(21) Appl. No.: 14/095,972

(22) Filed: Dec. 3, 2013

(65) Prior Publication Data

US 2014/0156246 A1 Jun. 5, 2014

(30) Foreign Application Priority Data

Dec. 4, 2012 (RU) .................................. 2012151896
Dec. 4, 2012 (RU) .................................. 2012151897

(51) Int. Cl.
*G01V 1/28* (2006.01)
*G01V 1/30* (2006.01)

(52) U.S. Cl.
CPC .......... *G01V 1/302* (2013.01); *G01V 2210/64* (2013.01); *G01V 2210/641* (2013.01); *G01V 2210/66* (2013.01); *G01V 2210/667* (2013.01)

(58) Field of Classification Search
None
See application file for complete search history.

(56) References Cited

U.S. PATENT DOCUMENTS

| 2003/0132934 A1* | 7/2003 | Fremming | G01V 1/30 345/419 |
| 2011/0002194 A1* | 1/2011 | Imhof | G01V 1/32 367/53 |
| 2014/0156245 A1* | 6/2014 | Cheskis | G01V 1/302 703/10 |

FOREIGN PATENT DOCUMENTS

| RU | 2289829 C1 | 12/2006 |
| RU | 2390805 C1 | 5/2010 |

* cited by examiner

*Primary Examiner* — Omar Fernandez Rivas
*Assistant Examiner* — Herng-Der Day
(74) *Attorney, Agent, or Firm* — TransPacific Law Group; Pavel I. Pogodin (57) ABSTRACT

Systems for modeling and building models of oil and gas deposits. In particular, the utility model relates to systems designed for automated identification of surfaces for building a geologic-hydrodynamic model of an oil and gas deposit based on seismic data. A technical result is the improvement of the accuracy in building a geological-hydrodynamic model of an oil-and-gas deposit. The objective of this utility model is to provide a system designed for building a geological-hydrodynamic model, in particular, automated (that is, requiring the user to participate only in the stage of initial data input) construction of a set of surfaces based on input seismic data. The output surfaces can be used, without additional processing, to construct a geological-hydrodynamic grid. The input data for the system are volumes of seismic data attributes P, Q; and seismic volume (optional).

4 Claims, 6 Drawing Sheets

SYSTEM FOR AUTOMATED IDENTIFICATION OF SURFACES FOR BUILDING OF GEOLOGIC HYDRODYNAMIC MODEL OF OIL AND GAS DEPOSIT BY SEISMIC DATA

CROSS-REFERENCE TO RELATED PATENT APPLICATIONS

This U.S. patent application is related to the following U.S. patent applications: U.S. patent application Ser. No. 14/094,773 entitled "SYSTEMS AND METHODS FOR DETERMINING POSITION OF MARKER DEPTH COORDINATES FOR CONSTRUCTION OF GEOLOGICAL MODEL OF DEPOSIT," U.S. patent application Ser. No. 14/094,776 entitled "SYSTEMS AND METHODS FOR DETERMINING POSITION OF MARKER DEPTH COORDINATES FOR CONSTRUCTION OF GEOLOGICAL MODEL OF DEPOSIT," U.S. patent application Ser. No. 14/094,779 entitled "SYSTEM FOR DETERMINING POSITION OF MARKER DEPTH COORDINATES FOR CONSTRUCTION OF GEOLOGICAL MODEL OF DEPOSIT," and U.S. patent application Ser. No. 14/094,783 entitled "SYSTEM FOR DETERMINING POSITION OF MARKER DEPTH COORDINATES FOR CONSTRUCTION OF GEOLOGICAL MODEL OF DEPOSIT," all of which are incorporated by reference herein in their entirety. This U.S. patent application is also related to U.S. patent application Ser. No. 14/094,810 filed on the same day and entitled "SYSTEMS AND METHODS FOR AUTOMATED IDENTIFICATION OF SURFACES FOR BUILDING OF GEOLOGIC-HYDRODYNAMIC MODEL OF OIL AND GAS DEPOSIT BY SEISMIC DATA," which is incorporated by reference herein in its entirety.

BACKGROUND OF THE INVENTION

Technical Field

The described embodiments generally relate to systems for modeling and building models of oil and gas deposits. More particularly, the described embodiments relate to systems, designed for automated identification of surfaces for building a geologic-hydrodynamic model of an oil and gas deposit based on seismic data.

Description of the Related Art

Known in the art is a system for geophysical exploration of oil-and-gas objects (RU 2289829 C1, G01V 11/00, 20.12.2006) for optimized location of deep wells in oil-and-gas objects based on a set of land, seismic, electrical, magnetic, and gravitational prospecting operations as well as on the basis of data obtained from electric, radioactive, acoustic, seismic, magnetic, and gravitational logging, core analysis and well tests. Data of acoustic, seismic, electric, radioactive, magnetic, and gravitational logging, as well as laboratory core studies are used for building stiffness, electric, magnetic, and gravimetric models of the target interval of geological section in wells and for evaluating geophysical synthesized traces, which are used for carrying out spectral-time analysis of seismic records (SVAN) and for determining model SVO and their spectral-time attributes (STA). The spectral-time attributes (STA) are the ratios of the energy of high frequencies and long times to the energy of low frequencies and short times, as well as the products of specific spectral density by the weighted mean frequency and time or by maximal frequency and time of energy spectra of SVAN column on the frequency and time axis.

A system for the control of geometric and hydrodynamics parameters of reservoir hydraulic fracturing (RU 2390805 C1, G01V 5/12, 27.05.2012), is also known. The operation of the system comprises determination, before reservoir fracturing, of radon concentration in 50-70 cm deep pits on a grid with 50 m step within a square area 400×400 m centered in the well mouth. Data of surface surveys are used to draw lines of geodynamic zones, which can be linked with newly formed fracture systems caused by hydraulic fracturing (because of high pressure). Radon indicator studies are carried out in the well before the hydraulic fracturing, and the engineering conditions of the well are determined, including behind-casing fluid flows, if any, their direction, the percentage distribution of the pumped liquid between such flows, water injection profile based on data of measurements with three repetitions, and the permeability.

A drawback of the conventional solutions is that they fail to ensure the building of a high-accuracy model of an oil-and-gas prospect based on seismic data alone. Therefore, new and improved systems for generating high-accuracy geological models are needed.

SUMMARY OF THE INVENTION

The embodiments described herein are directed to methods and systems that substantially obviate one or more of the above and other problems associated with conventional systems for constructing of geological models.

In accordance with one aspect of the embodiments described herein, there is a provided a computerized system for automated identification of surfaces for building a geologic-hydrodynamic model of an oil-and-gas deposit based on seismic data, comprising: a data identification module; a surface-continuation module which is linked to the data identification module and comprises the following modules connected in series: a module for determination of surfaces, whose input is the input of the surface-continuation module; a domain determination module; a grid node adding module; a module for setting parameters of seismic attribute volumes; a module for setting coordinates of the newly added node; a module for determining coordinates of the adjacent node; and a module for setting a surface depth parameter in this node, whose exit is the exit of the surface-continuation module; a surface-sorting module which is linked with the surface-continuation module and comprising the following modules connected in series: a module of ordering the depths of surfaces, whose input is the input of the surface-sorting module, and a module for setting depths of surfaces, whose exit is the exit of the surface-sorting module; a clarification module which is linked with the surface-sorting module of sorting and which comprising the following modules connected in series: a module for determining the surfaces to be processed, whose input is the input of the clarification module; a module for determining functionals and gradients of surfaces to be processed; a module for determining the displacement distance; a module for determining the attainment of the minimal value of the functional; a displacement module; a memory module; an exclusion module; a module for determining processed surfaces, the latter module having one exit connected with the input of the surface-sorting and another exit connected with the input of the module for determining the current grid pitch, which has one exit connected with the input of the module for determining surfaces to be processed and another exit connected with the input of the module for iteration and determining of the attained size, the module for iteration and determination of the attained size being connected with the data identification module and being provided with a possibility of enabling iterative implementation of the functions of the data identification module, the surface-continuation module, the surface-sorting module, the clarification module, the module of determining the current grid pitch, and the module for iteration and determination of the attained size until a model with parameters identified by the data identification module is obtained.

In one or more embodiments, the computerized system further comprises: a module of determining surfaces with larger definition domain, connected with the module of iteration and determination of size; the module of determining surfaces with larger definition domain comprising the following modules connected in series: a module for determining the point of surface, a module for determining a segment; and a module for determining the local extremum of depth nearest to the given point, the exit of the module for determining surfaces with larger definition domain being the exit of the system.

In one or more embodiments, the local extremum is the minimal value of depth.

In one or more embodiments, the local extremum is the maximum value of depth.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The problem addressed by one or more of the described embodiments of the invention is to provide a system designed for the building a geological-hydrodynamic model, namely, automated (that is, requiring the user to participate only in the stage of initial data input) construction of a set of surfaces based on the input seismic data. The surfaces obtained on the output can be used, without additional processing, for constructing a geological-hydrodynamic grid. The input data for the system are volumes of seismic data attributes P, Q; and a seismic volume (optional).

A technical result achievable using one or more embodiments described herein is the improvement of the accuracy of building a geological-hydrodynamic model of an oil-and-gas deposit.

FIGS. 1, 2, 3, 4 and 5 present a general flow-chart for the implementation of the described one or more embodiments of the system.

An exemplary embodiment of a system for automated identification of surfaces in the building of a geological-hydrodynamic model of an oil-and-gas deposit by seismic data comprises: an input data identification module 100 intended for determining a grid pitch of the geological-hydrodynamic model, the maximal allowable size of the model on the coordinate grid and the control parameters of the surface relative to the grid pitch; a surface-continuation module 200 linked to the previous module that is used for the extension of surfaces and contains the following modules connected in series: a module 210 for surface determination (the input of which is the input of surface-continuation module 200) designed for determining grid surfaces relative to the grid pitch; a domain-determination module 220 for determining domains designed for determining the domain where the surface is defined; and a grid node addition module 230 which is designed for adding grid nodes where the surface has not been defined to those already defined; a module 240 for establishing parameters of volumes of seismic attributes p, q; a module 250 for establishing the coordinates of the newly added node—X, Y; a module 260 for establishing coordinates of the adjacent node—x, y, in which the surface is defined; and a module 270 for establishing the parameter of surface depth in this node z(x,y) (the exit of the module 270 is the exit of the module 200); a surface-sorting module 300 linked to the module 270 that comprises the following modules connected in series: a surface-depth ordering module 310 (the input of which is the input of surface-sorting module 300) designed for arranging the depths of the surfaces in a given grid node in the ascending order; and a surface-depth assigning module 320 designed for assigning the depth of the i-th surface in this node the i-th depth in the ascending order (the exit of the module 320 is the exit of the module 300); a clarification module 400 which is linked to the module 320 and comprises the following modules connected in series: a surface-determination module 410 for determining surfaces to be processed (whose input is the input of the clarification module 400); module 420 for determining functionals and gradients of surfaces to be processed; a displacement determination module 430 for determining a distance of displacements along the gradient which is designed for determining the length of the current displacement step along the gradient; a module 440 for determining the attainment of the minimal value of the functional which is designed for determining, with the use of the gradient displacement step, what number of steps will be required to reach the minimal value of the functional; a displacement module 450 designed to perform displacement for the obtained number of steps along the gradient when the determined minimal value of the functional for each surface being processed is less than the displacement step along the gradient; a memory module 460 for memorizing the size of the implemented displacement in the internal memory and for determining the maximum of implemented displacements; an elimination module 470 designed for temporary exclusion from processing the surfaces for which the functional has been decreased; a module 480 for determining the processed surfaces designed for determining surfaces for which the functional has not been decreased, one exit of this module being connected with the input of the surface-determination module 410 and with another exit with the input of the surface-sorting module 300, so that when the surfaces for which the functional has not been decreased are determined, a signal from the exit of module 480 is transmitted to an input of a current grid pitch determination module 500 which is designed for determining the current grid pitch on the basis of the renewed surface data, and so that when the size of the current grid pitch is not small enough, the signal from module 500 for determining the current step is transmitted to the input of surface-determination module 410 and then the operation of the modules connected in series is repeated but now for the renewed data, otherwise, the signal from module 500 for determining the current grid pitch is transmitted to the input of module 600 for iteration and determination of the grid size (whose exit is the exit of the system) which is designed to determine whether the specified grid size was attained, wherein the module 600 for iteration and determining the obtained grid size being connected with the input data identification module 10, and when the grid size is not attained, the module 600 provides an iterative implementation of functions of the modules 100, 200, 300, 400, 500, 600 until a model with parameters identified by module 100 is obtained. Additionally, the system may comprise a module 700 which is connected to the module 600 and is designed for determining surfaces with a larger definition domain, the module 700 comprising the following modules connected in series: a grid-point determination module 710 for determining a point on the surface of the grid; a segment determination module 720 which is designed for determining a segment for tracing a seismic volume around the surface point determined by the module 710; and a module 730 for determining the local extremum of the depth nearest to this point, the exit of module 700 being the exit of the system.

In one or more embodiments, the modules used in the system can be either electronic computers or program modules, which implement their function under the control of electronic computers. The electronic computer can be represented by, but is not limited to a supercomputer, personal computer, portable computer, tablet computer, hand-held computer, smartphone, etc. The device necessarily contains one or a plurality of processors intended for executing computer commands or codes, which are stored in the memory of the device with the aim to implement the first or second variant of this utility model, a machine-readable data carrier (memory) and input/output modules (I/O). The I/O modules are represented by, but not limited to control means standard and known in the art for used with the above devices such as a mouse, keyboard, joystick, touchpad, trackball, beam pen, stylus, sensor display, etc. The I/O modules also are represented by, but not limited to, information display means typical and known in the art for use with the above devices such as a monitor, projector, printer, graph-plotter, etc. As an example, but not limitation, the machine-readable data carrier may contain a random-access memory (RAM); a read-only memory (ROM); an electronically erasable programmable read-only memory (EE-PROM); a flash-memory, or other memory devices; a CDROM, digital versatile disk (DVD), or other optical or holographic data carriers; magnetic cassettes, magnetic tape, magnetic disk storage or other magnetic memory devices, carrying waves or other data carriers, which can be used for coding the required data and accessed by the devices described above. The program modules can be code modules based on any programming language (control program elements) designed for the implementation of function intrinsic in the modules and integrated and controlled by a single control program.

In one or more embodiments, the system described herein enables a set of surfaces, which ensures the best agreement with the input data, i.e., seismic attributes P and Q, to be obtained for a set of surfaces chosen as an initial approximation. The agreement is understood as follows. By their physical meaning, the seismic attributes P and Q in combination determine a field of planes. A functional is introduced, which is equal to the deviation of the tangent plane in each point of the surface from this field. The minimum of this functional is sought by the method of quickest descent along the gradient adapted to the problem.

In one or more embodiments, the success in the operation of the system is ensured by the following criteria:
1. simultaneous (parallel) identification and subsequent improvement of a large enough number of surfaces;
2. a family of functionals, the minimization of which forms a basis for successful operation of the system;
3. the functioning of the system looks as a chain of iteration stages; after appropriate transformation the output data of each stage enters the following stage; and
4. an optimal choice of initial approximations, supplied to the entry of iteration algorithms which minimize the functionals.

In one or more embodiments, correlation of surfaces is carried out for deriving information required for predicting the composition and properties of rocks. The correlation of a surface is the process of the passage from a trace of the seismic volume of wave phase to another such trace, corresponding to the same reflecting boundary. In other words, this is the process of tracing the reflecting surfaces per se. The surfaces are correlated by the zero, negative, or positive phase.

In one or more embodiments, the proposed system suggests the use not of the seismic volume but rather the derived data, i.e., the so-called seismic attributes P and Q. Those attributes, for each point of each trace, show the angle at which the maximally similar point of the nearby trace is oriented. Thus, we can assume that such attributes determine a field of planes tangent to the reflecting surfaces, and the problem is reduces to constructing surfaces for which this field of planes is tangent. This is made by minimizing the functional. A functional is introduced, which measures the total deviation of the field of planes specified by P, Q attributes from the tangent planes to surfaces of the set. The gradient descent method enables the passage to a new set of surfaces, for which the value of the functional is smaller and which therefore has better agreement with the input data.

In one or more embodiments, the system generally comprises four modules used at each iteration of its operation:
1. Continuation module. This module solves a problem of continuation of the surface into the domains where it is not defined is solved. This module is used, in particular, in the construction of initial approximations.

2. Improvement module. This module builds an integral surface by the field of (tangent) planes determined by P, Q volumes based on minimizing the functional.

3. Sorting module. This module reconstructs the surfaces over the depth. The problem of exclusion of intersection of surfaces is solved.

4. Additional module for determining surfaces with a larger definition domain.

Next, the implementation of stages is described in detail.

Continuation Module

Input: set of surfaces. The surfaces are defined not over the entire grid.

p, q—volumes of seismic attributes

Output: set of surfaces with a wider definition domain.

Operations to be performed within a loop:

1. For each surface add, to the surface definition domain, grid nodes in which the surface is not defined, but which have neighbor grid nodes in which it is defined.

2. If no nodes could be added to any surface, exit the loop.

3. For each of the newly added nodes:

A) Evaluate the formula:

$$Z = \frac{\sum (z(x, y) + (X - x) \times p(x, y, z) + (Y - y) \times q(x, y, z)) / \sqrt{(X - x)^2 + (Y - y)^2}}{\sum 1 / \sqrt{(X - x)^2 + (Y - y)^2}}$$

Here p, q are volumes of seismic attributes, X, Y are coordinates of the newly added node, x, y are coordinates of the adjacent node in which the surface is defined, and z(x,y) is the depth of the surface at this node. The sum is extended to all adjacent nodes in which the surface is defined.

B) Check that the surface thus extended lies within the required domain in the space.

The meaning of the above formula is as follows. For each adjacent node, the expression z(x,y)+(X−x)×p(x,y,z)+(Y−y)×q(x,y,z) is a linear Taylor approximation of the value in the new node based on that in the adjacent node. Such linear approximations for all adjacent nodes are then averaged with weights. The weights are inversely proportional to the distances between the added and adjacent nodes.

1. If the value could not be calculated in any added node, then the surface is defined in every node of the grid.

Clarification Module

Input: a set of surfaces as the initial or start approximation, p, q—volumes of seismic attributes.

In one or more embodiments, minimized is a functional which is equal to the sum of square deviations of partial derivatives with respect to x, y of equations describing the surfaces from the values of P and Q of the attributes, respectively:

$$F = \sum \left[\frac{\partial z}{\partial x}(x_i, y_j) - p(x_i, y_j, z_{i,j})\right]^2 + \sum \left[\frac{\partial z}{\partial y}(x_i, y_j) - q(x_i, y_j, z_{i,j})\right]^2$$

In one or more embodiments, the sum embraces all nodes and all surfaces of the set.

In one or more embodiments, the functional is minimized by the quickest gradient descent, appropriately optimized and adapted to the case.

Exemplary module operating algorithm:

1. Calculate, what surfaces will be processed: if the step made at the preceding steps was too small, they will not be processed.

2. Evaluate the functional.

3. Evaluate the gradient.

4. Next, in a loop:

5. Evaluate the current step in the displacement along the gradient.

6. For each surface to be processed: move along the gradient with this step and determine how many steps will be required to reach the minimal value of the functional.

7. For each surface to be processed: if the obtained minimal value of the functional is less than the input value, then: make the obtained number of steps along the gradient.

8. Save the size of the displacement and calculate the maximum of the displacements made.

9. Temporarily exclude the surface from the processing (i.e., the surfaces for which a decrease in the functional was attained are temporarily excluded from processing).

10. Check, whether the functional has been decreased for all surfaces. If this is so, exit the loop and stop the algorithm.

11. If the functional has not been decreased for all surfaces, but the current step of displacement is small enough, exit the loop.

12. Otherwise, return to the beginning of the loop. (Only the surfaces for which the functional could not be decreased will be processed at the next step of the loop).

Sorting Module

In one or more embodiments, the execution of this module results in that the depths that correspond to a surface can be assigned to another surface. Through this procedure, the surfaces as if "push" one another toward the correct solution.

Exemplary module operating algorithm:

Loop over all nodes:

1. Arrange the surfaces in this node by ascending depth.

2. Assign the value of the i-th depth in the ordered series to the depth of the i-th surface in the node.

Additional Module for Determining Surfaces with Larger Definition Domain

In one or more embodiments, a simple procedure, in which each point of each surface in a certain neighborhood in terms of depth is moved toward a local minimum or maximum of the seismic volume. If no extremum is found in the specified neighborhood, the point is discarded. Thus, we obtain a set of surfaces in better agreement with the seismic data. This procedure is also of use for neutralizing typical problems that occur in application of the gradient descent method.

Exemplary module operating algorithm:

Loop over all nodes:

Loop over the set of surfaces

1. Take the point on the surface that corresponds to the node.

2. Take the segment of the appropriate trace of the seismic volume around this point and find in this segment the required local extremum (maximum or minimum) nearest to the point.

3. If a local extremum was found, replace the depth of the surface in this node by the depth of the local extremum.

4. If no local extremum was found, a gap will appear in the surface, i.e., the surface is assumed not defined in this node.

The description of the main operations for the implementing of the method of automated identification of surfaces for building a geological-hydrodynamic model of an oil-and-gas deposit based on seismic data:

Input: a set of trend surfaces as the initial or start approximation. When no such surfaces are available, surfaces constant over depth are used.

P, Q—volumes of seismic attributes

Optional: seismic volume

Output: a set of surfaces used to build a geological-hydrodynamic grid.

In one or more embodiments, the first approximation is trend surfaces (in the absence of such, constant surfaces are used) on a coarse grid. Each iteration is a combination of procedures described above. Each subsequent iteration is made on a finer grid with the solution at the previous iteration taken as an initial approximation. Iterations are repeated until the maximal size of grid is obtained.

Figure 1:
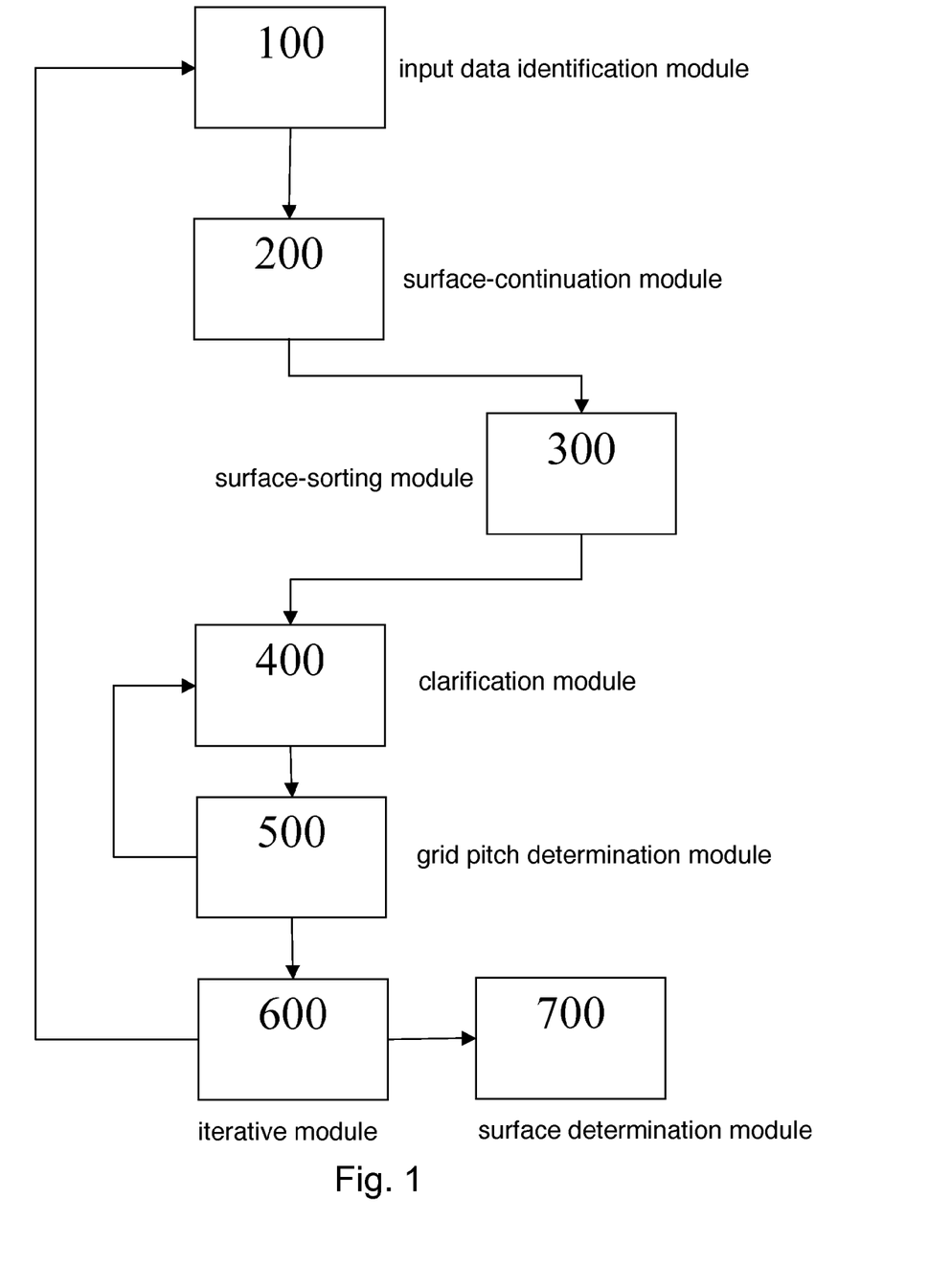
FIGS. 1, 2, 3, 4 and 5 present a general flow-chart for the implementation of the described one or more embodiments of the system.
Figure 2:
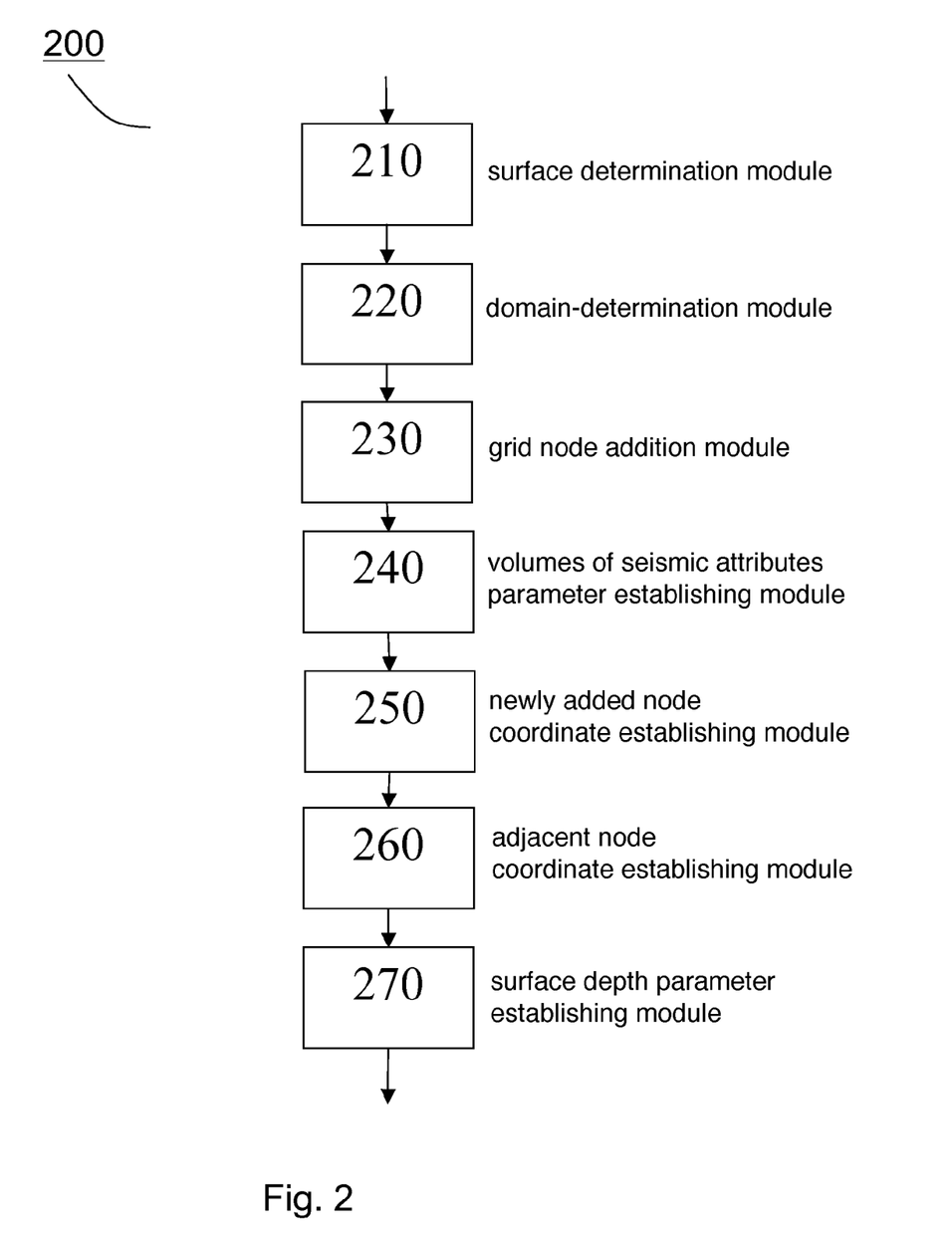
Figure 3:
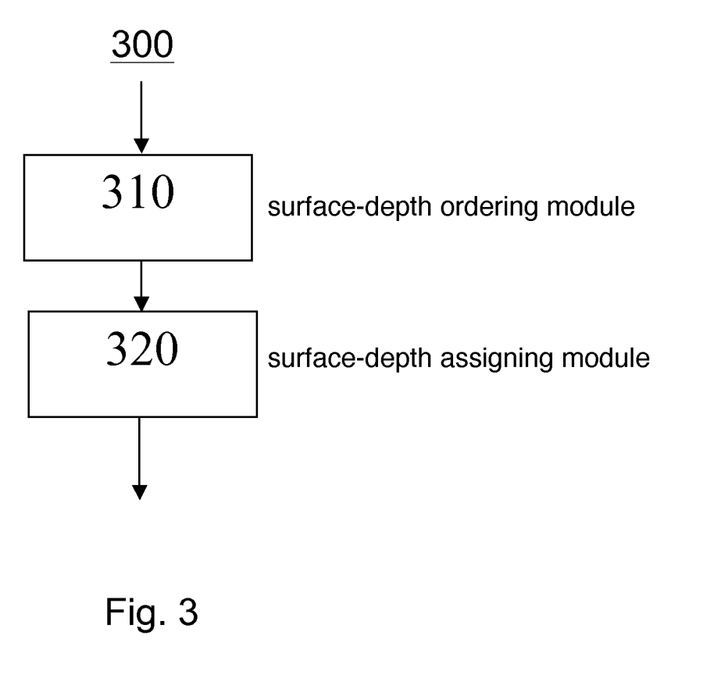
Figure 4:
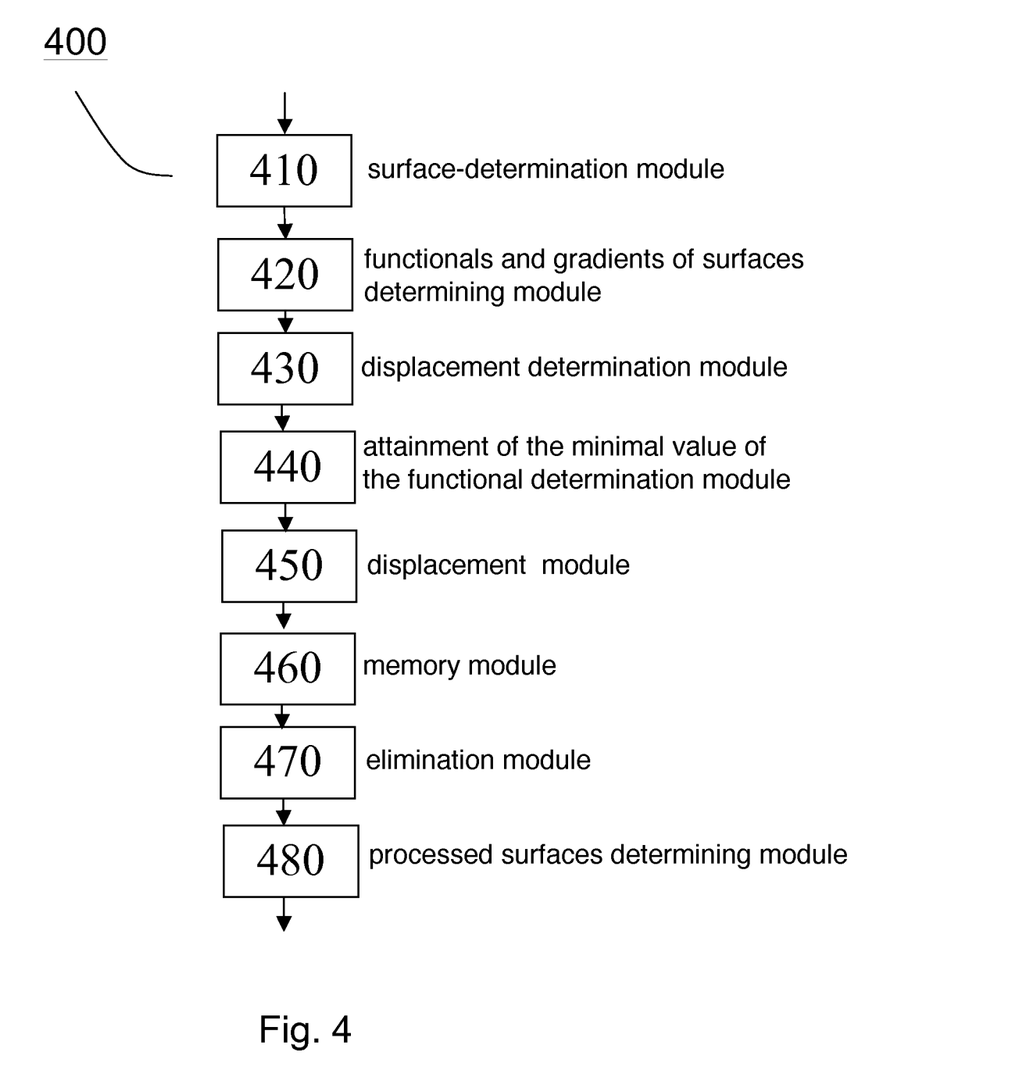
Figure 5:
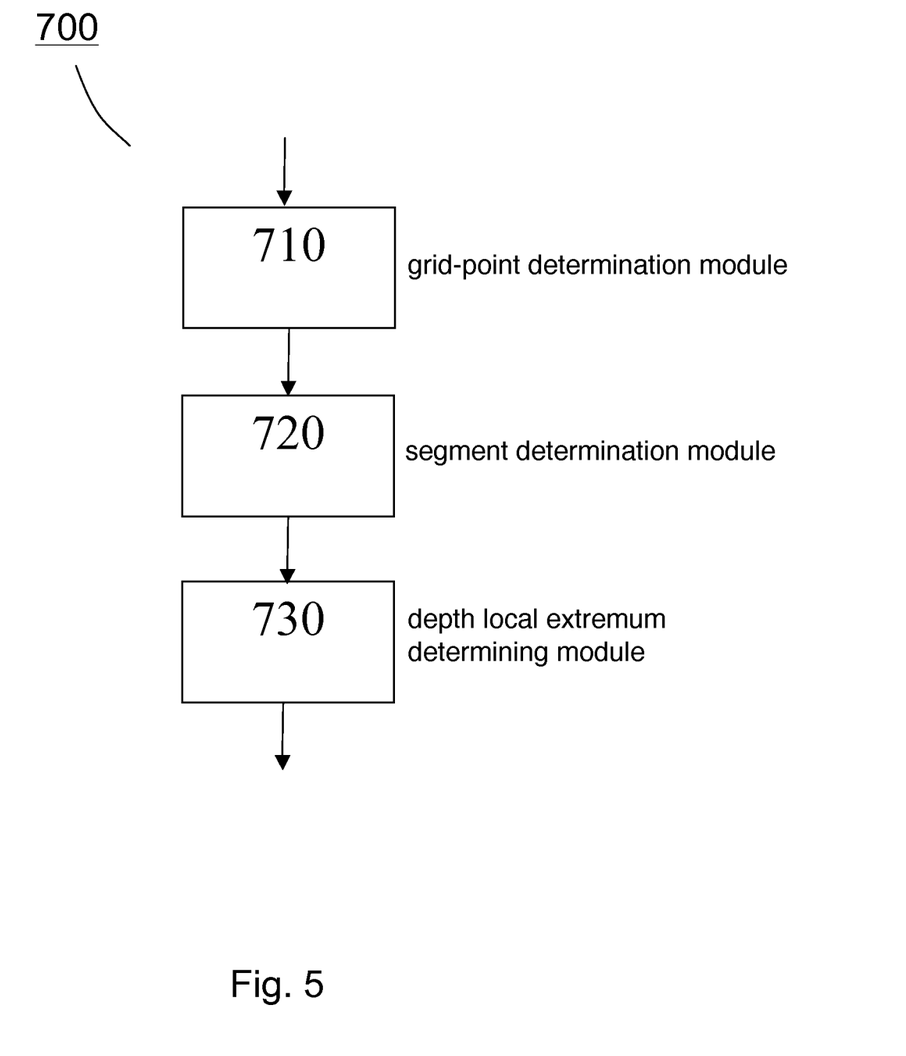
Figure 6:
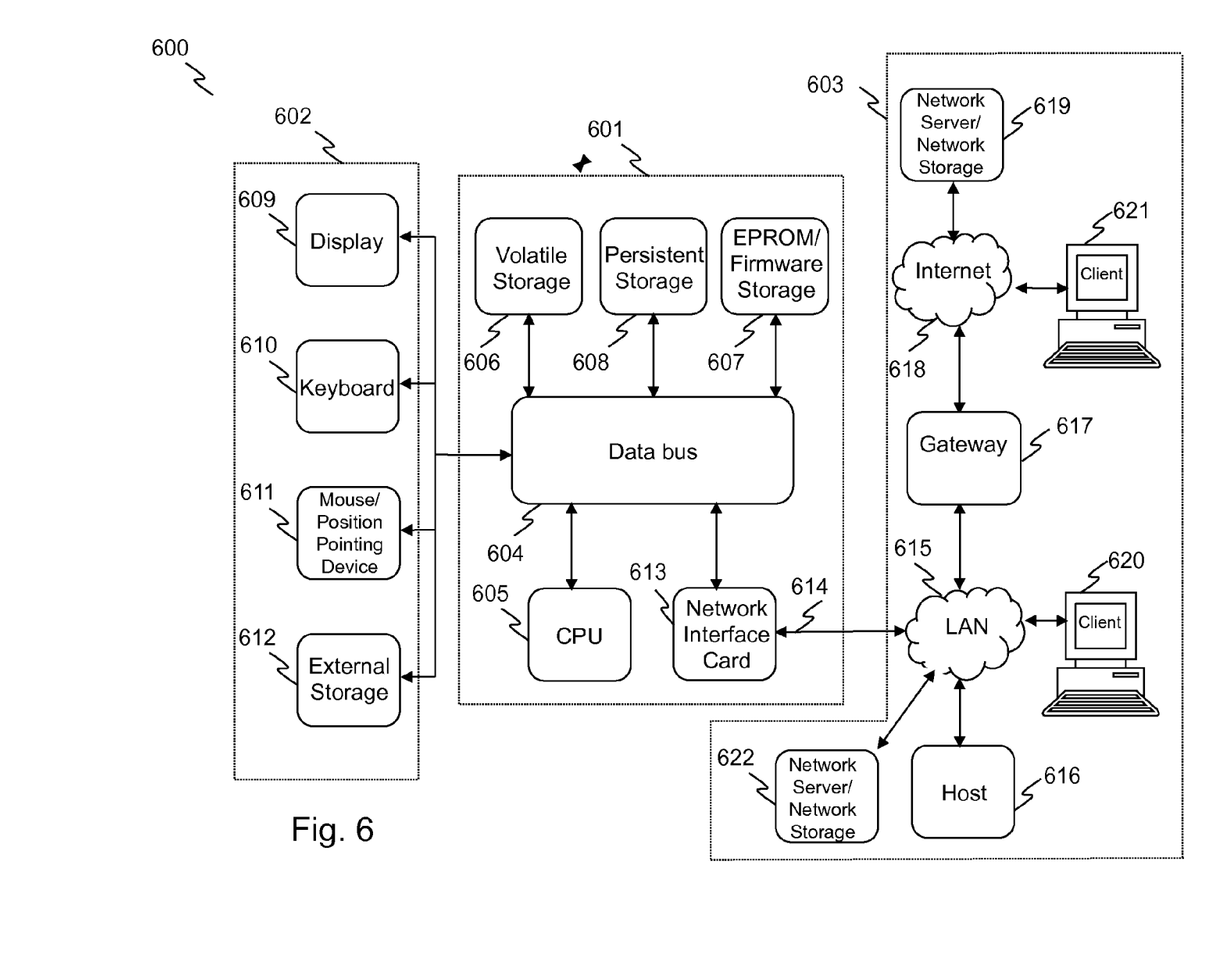
FIG. 6 is a block diagram that illustrates an exemplary embodiment of a computerized system upon which the described embodiments of the invention may be deployed.

FIG. 6 is a block diagram that illustrates an exemplary embodiment of a computer system 600 upon which the described invention may be deployed. The system 600 includes a computer platform 601, peripheral devices 602 and network resources 603.

The computer platform 601 may include a data bus 604 or other communication mechanism for communicating information across and among various parts of the computer platform 601, and a processor 605 coupled with bus 604 for processing information and performing other computational and control tasks. Computer platform 601 also includes a volatile storage 606, such as a random access memory (RAM) or other dynamic storage device, coupled to bus 604 for storing various information as well as instructions to be executed by processor 605, including the software application for proxy detection described above. The volatile storage 606 also may be used for storing temporary variables or other intermediate information during execution of instructions by processor 605. Computer platform 601 may further include a read only memory (ROM or EPROM) 607 or other static storage device coupled to bus 604 for storing static information and instructions for processor 605, such as basic input-output system (BIOS), as well as various system configuration parameters. A persistent storage device 608, such as a magnetic disk, optical disk, or solid-state flash memory device is provided and coupled to bus 604 for storing information and instructions.

Computer platform 601 may be coupled via bus 604 to a touch-sensitive display 109, such as a cathode ray tube (CRT), plasma display, or a liquid crystal display (LCD), for displaying information to a system administrator or user of the computer platform 601. An input device 610, including alphanumeric and other keys, is coupled to bus 604 for communicating information and command selections to processor 605. Another type of user input device is cursor control device 611, such as a mouse, a trackball, or cursor direction keys for communicating direction information and command selections to processor 605 and for controlling cursor movement on touch-sensitive display 609. This input device typically has two degrees of freedom in two axes, a first axis (e.g., x) and a second axis (e.g., y), that allows the device to specify positions in a plane. To detect user's gestures, the display 609 may incorporate a touchscreen interface configured to detect user's tactile events and send information on the detected events to the processor 605 via the bus 604.

An external storage device 612 may be coupled to the computer platform 601 via bus 604 to provide an extra or removable storage capacity for the computer platform 601. In an embodiment of the computer system 600, the external removable storage device 612 may be used to facilitate exchange of data with other computer systems.

The invention is related to the use of computer system 600 for implementing the techniques described herein. In an embodiment, the inventive system may reside on a machine such as computer platform 601. According to one embodiment of the invention, the techniques described herein are performed by computer platform 601 in response to processor 605 executing one or more sequences of one or more instructions contained in the volatile memory 606. Such instructions may be read into volatile memory 606 from another computer-readable medium, such as persistent storage device 608. Execution of the sequences of instructions contained in the volatile memory 606 causes processor 605 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 605 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as the persistent storage device 608. Volatile media includes dynamic memory, such as volatile storage 606.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 605 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 604. The bus 604 carries the data to the volatile storage 606, from which processor 605 retrieves and executes the instructions. The instructions received by the volatile memory 606 may optionally be stored on persistent storage device 608 either before or after execution by processor 605. The instructions may also be downloaded into the computer platform 601 via Internet using a variety of network data communication protocols well known in the art.

The computer platform 601 also includes a communication interface, such as network interface card 613 coupled to the data bus 604. Communication interface 613 provides a two-way data communication coupling to a network link 614 that is coupled to a local network 615. For example, communication interface 613 may be an integrated services digital network (ISDN) card or a modem to provide a data communication connection to a corresponding type of telephone line. As another example, communication interface 613 may be a local area network interface card (LAN NIC)

to provide a data communication connection to a compatible LAN. Wireless links, such as well-known 802.11a, 802.11b, 802.11g and Bluetooth may also used for network implementation. In any such implementation, communication interface 613 sends and receives electrical, electromagnetic or optical signals that carry digital data streams representing various types of information.

Network link 614 typically provides data communication through one or more networks to other network resources. For example, network link 614 may provide a connection through local network 615 to a host computer 616, or a network storage/server 622. Additionally or alternatively, the network link 614 may connect through gateway/firewall 617 to the wide-area or global network 618, such as an Internet. Thus, the computer platform 601 can access network resources located anywhere on the Internet 618, such as a remote network storage/server 619. On the other hand, the computer platform 601 may also be accessed by clients located anywhere on the local area network 615 and/or the Internet 618. The network clients 620 and 621 may themselves be implemented based on the computer platform similar to the platform 601.

Local network 615 and the Internet 618 both use electrical, electromagnetic or optical signals that carry digital data streams. The signals through the various networks and the signals on network link 614 and through communication interface 613, which carry the digital data to and from computer platform 601, are exemplary forms of carrier waves transporting the information.

Computer platform 601 can send messages and receive data, including program code, through the variety of network(s) including Internet 618 and LAN 615, network link 615 and communication interface 613. In the Internet example, when the system 601 acts as a network server, it might transmit a requested code or data for an application program running on client(s) 620 and/or 621 through the Internet 618, gateway/firewall 617, local area network 615 and communication interface 613. Similarly, it may receive code from other network resources.

The received code may be executed by processor 605 as it is received, and/or stored in persistent or volatile storage devices 608 and 606, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems for constructing of geological models. It is intended that the specification and examples be considered as exemplary only, with a true scope and spirit of the invention being indicated by the following claims.

What is claimed is:

1. A computerized system for automated identification of surfaces for building a geologic-hydrodynamic model of an oil-and-gas deposit based on seismic data, comprising:
   one or more processors;
   an input/output module (I/O);
   a non-transitory computer-readable medium containing a program code, which, when executed, will induce the one or more processors to execute the following modules:
   a data identification module for identifying model parameters including grid pitch;
   a surface-continuation module which is linked to the data identification module and comprises the following modules connected in series:
     a module for determination of surfaces, whose input is the input of the surface-continuation module;
     a domain determination module for determining a domain where each determined surface is defined;
     a grid node adding module for adding new grid node;
     a module for setting parameters of seismic attribute volumes;
     a module for setting coordinates of the newly added node;
     a module for determining coordinates of an adjacent node; and
     a module for setting a surface depth parameter in the adjacent node, whose exit is the exit of the surface-continuation module;
   a surface-sorting module which is linked with the surface-continuation module and comprising the following modules connected in series:
     a module of ordering depths of surfaces, whose input is the input of the surface-sorting module, and
     a module for setting the depths of surfaces, whose exit is the exit of the surface-sorting module;
   a clarification module which is linked with the surface-sorting module and which comprising the following modules connected in series:
     a module for determining surfaces to be processed, whose input is the input of the clarification module;
     a module for determining functionals and gradients of the surfaces to be processed;
     a module for determining a displacement distance;
     a module for determining an attainment of a minimal value of each determined functional;
     a displacement module to perform displacement;
     a memory module;
     an exclusion module for temporary exclusion from processing any surface for which the corresponding functional has been decreased; and
     a module for determining processed surfaces;
   a module for determining a current grid pitch;
   a module for iteration and determining of an attained size;
   wherein the module for determining processed surfaces having one exit connected with the input of the surface-sorting module and another exit connected with the input of the module for determining the current grid pitch, which has one exit connected with the input of the module for determining surfaces to be processed and another exit connected with the input of the module for iteration and determining of the attained size, the module for iteration and determination of the attained size being connected with the data identification module and being provided with a possibility of enabling iterative implementation of the functions of the data identification module, the surface-continuation module, the surface-sorting module, the clarification module, the module of determining the current grid pitch, and the module for iteration and determination of the attained size until a model with the parameters identified by the data identification module is obtained.

2. The computerized system according to claim 1, further comprising:
a module for determining surfaces with larger definition domain, connected with the module for iteration and determination of the attained size; the module for determining surfaces with larger definition domain comprising the following modules connected in series:
a module for determining a point of surface,
a module for determining a segment; and
a module for determining a local extremum of depth nearest to the determined point, the exit of the module for determining surfaces with larger definition domain being the exit of the system.

3. The computerized system according to claim 2, wherein the local extremum is a minimal value of depth.

4. The computerized system according to claim 2, wherein the local extremum is a maximum value of depth.

* * * * *